B. G. VAUGHAN.
SETTING HEAD FOR MATCH MAKING MACHINES.
APPLICATION FILED SEPT. 12, 1910.
1,010,825.
Patented Dec. 5, 1911.
2 SHEETS—SHEET 1.
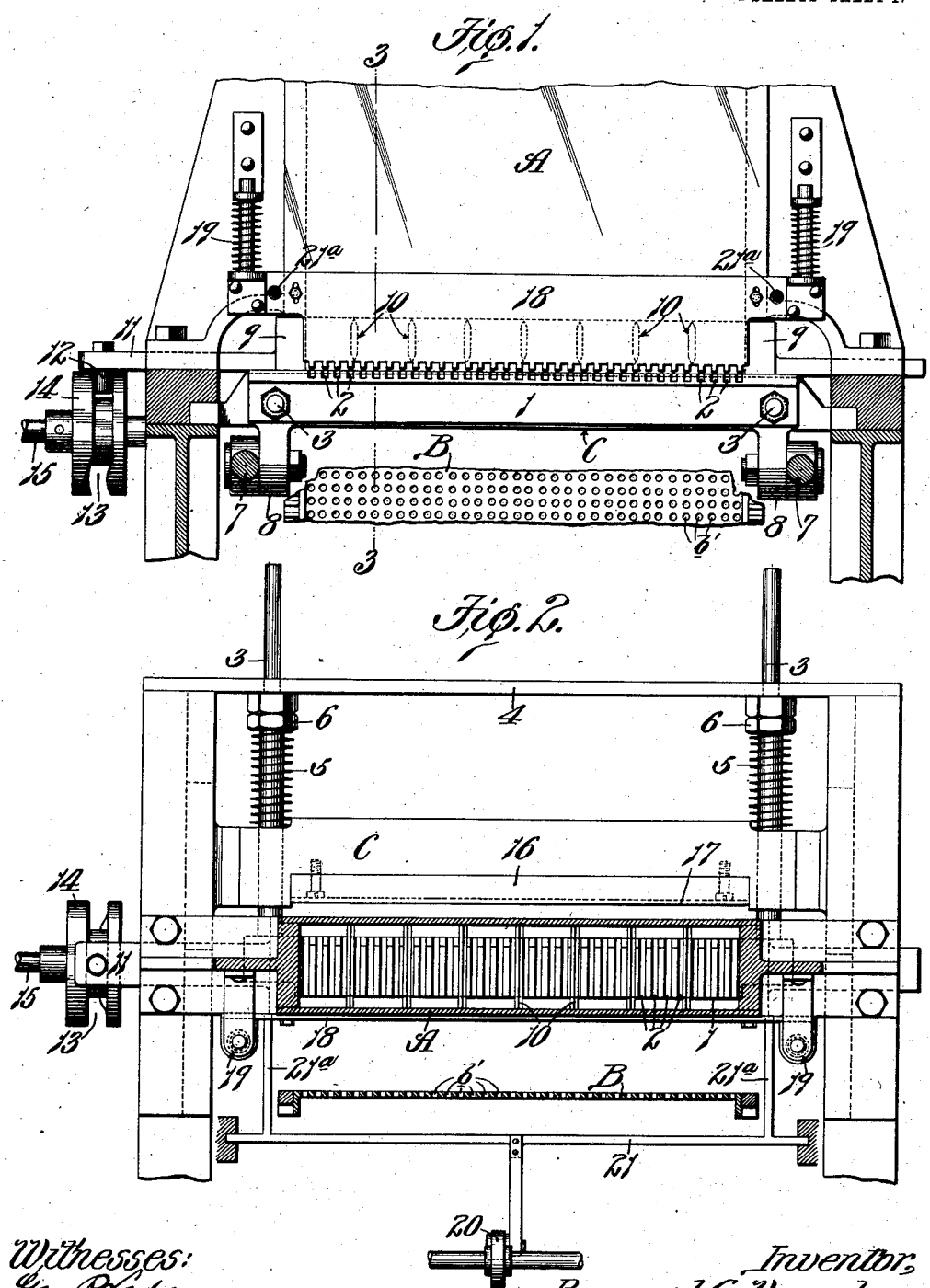

B. G. VAUGHAN.
SETTING HEAD FOR MATCH MAKING MACHINES.
APPLICATION FILED SEPT. 12, 1910.
1,010,825.
Patented Dec. 5, 1911.
2 SHEETS—SHEET 2.
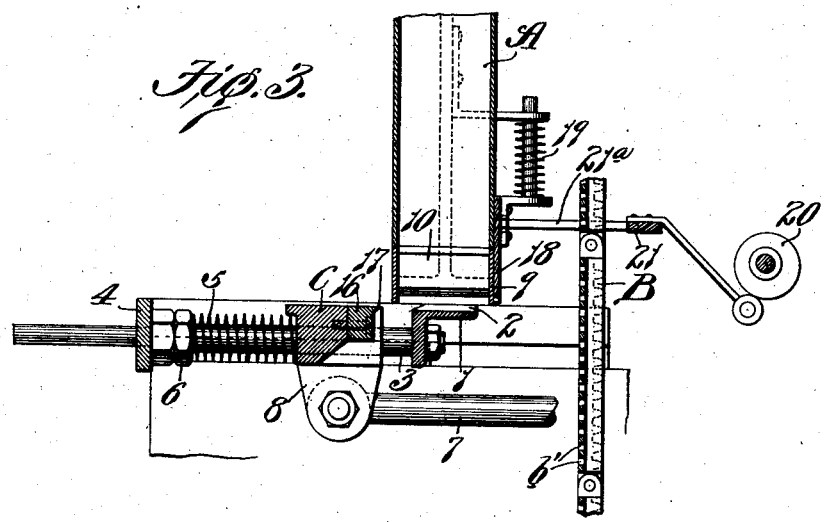
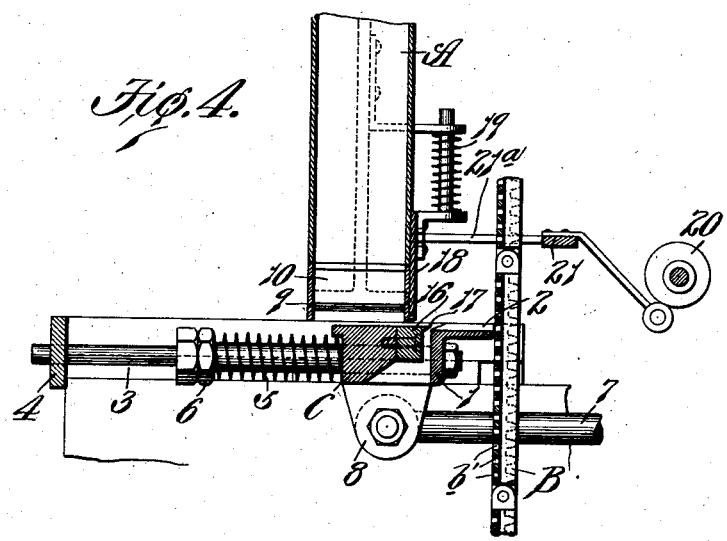
Witnesses:
Geo. R. Ladson
Wells L. Church.
Inventor,
Bernard G. Vaughan.
By Paul Bakewell Atty.

UNITED STATES PATENT OFFICE.

BERNARD G. VAUGHAN, OF JOLIET, ILLINOIS, ASSIGNOR TO NATIONAL MATCH COMPANY, OF JOLIET, ILLINOIS, A CORPORATION OF ILLINOIS.

SETTING-HEAD FOR MATCH-MAKING MACHINES.

1,010,825.  Specification of Letters Patent.  Patented Dec. 5, 1911.

Application filed September 12, 1910. Serial No. 581,538.

*To all whom it may concern:*

Be it known that I, BERNARD G. VAUGHAN, a citizen of the United States, residing at Joliet, Will county, Illinois, have invented a certain new and useful Improvement in Setting-Heads for Match-Making Machines, of which the following is a full, clear, and exact description, such as will enable others skilled in the art to which it appertains to make and use the same.

This invention relates to match-making machines, and particularly to the setting heads used in such machines for inserting the match-splints in the carrier which conveys the splints to the dipping tank.

One object of my present invention is to provide a setting head which is so designed that parts of same which are liable to wear out can be replaced and thus overcome the necessity of substituting an entire new head when any portion of same becomes worn.

Another object is to provide a setting head which is so designed that the short match-splints, dust and splinters which are mixed with the match-splints will not collect on the setting head during the operation of feeding the match-splints to said head.

Other objects and desirable features of my invention will be hereinafter pointed out.

Figure 1 of the drawings is a front elevational view of a portion of a match-making machine provided with a setting head constructed in accordance with my invention; Fig. 2 is a top plan view of the mechanism shown in Fig. 1; Fig. 3 is a vertical sectional view taken on approximately the line 3—3 of Fig. 1, showing the setting head arranged in receiving position; and Fig. 4 is a view similar to Fig. 3 but with the setting head arranged in delivering position.

Referring to the drawings which illustrate the preferred form of my invention, A designates the hopper of a match-making machine; B designates the match-splint-carrier which conveys the splints to the dipping tank, not shown, and C designates a reciprocating setting head arranged under the hopper for receiving the match-splints therefrom and inserting them in the splint-receiving openings b' of the carrier B. A movable member 1 which is carried by the head C and arranged in front of same is provided in its top face with grooves 2 that hold a plurality of match-splints in parallel relation to each other, said member 1 preferably consisting of a piece of commercially rolled angle iron arranged in the manner shown in Fig. 3. Guide-rods 3 which project rearwardly from the vertical flange or leg of the member 1, pass through openings in the setting head C and also through openings in a stationary abutment 4, and coiled expansion springs 5 are mounted on said rods between the setting head C and stops 6 on said rods. Movement is imparted to said setting head by means of links 7 which are pivotally connected to lugs 8 on the setting head, and a feeder 9 is arranged between the setting head and the hopper A so as to agitate the match-splints and feed them to the grooves 2 in the top face of the member 1 carried by said setting head. The machine herein shown is provided with a feeder 9 that consists of a comparatively shallow hopper provided with vertically disposed partitions 10 and having a laterally projecting arm 11 at one end that carries a roll 12 which projects into a double cam groove 13 formed in a cam block 14 that is secured to a driven shaft 15, said groove being so formed that the feeder is moved transversely of the setting head when the member 1 is in alinement with the feeder, as shown in Fig. 3. The particular construction of the feeder, the hopper and the match-splint-carrier, however, is immaterial so far as my present invention is concerned, and therefore I do not wish it to be understood that my improved setting head is limited to use with a match-making machine of the particular design herein shown.

The actuating means for the setting head C and the stops 6 on the guide-rods of the member 1 are so designed that said member will come to rest when it comes into alinement with the feeder 9 and the setting head C will continue to move rearwardly a short distance so as to form a space between the member 1 and the setting head and between the front edge of the member 1 and the front wall of the feeder 9 through which the short match-splints, the dust and the splinters can escape and thus not lodge on the setting head.

In machines of this type the splint-carrier often gets out of alinement slightly and the result is that when the setting head moves toward the carrier the front ends of the match-splints strike the edges of the splint-receiving openings $b'$ in the carrier and consequently causes the rear ends of the match-splints to tilt upwardly off the setting head. To overcome this objectionable feature and eliminate the possibility of the match-splints tilting I have provided the setting head with a bar 16 that has a tooth 17 which bites into the rear ends of the match-splints when the setting head moves toward the carrier B and thus exerts sufficient pressure on the rear ends of the match-splints to prevent them from tilting upwardly off the splint-supporting member 1 in case the openings $b'$ in the carrier do not aline perfectly with the match-splints. The bar 16 extends transversely of the setting head C and is detachably connected thereto by suitable fastening devices so that it can be removed and sharpened or replaced by a new bar when it becomes worn, the top face of said bar being preferably flush with the top face of the setting head C so that it will coöperate with the setting head to form a support for the match-splints in the feeder 9 when the setting head is in its delivering position, as shown in Fig. 4.

The machine herein shown is provided with a comb 18 arranged on the front wall of the hopper A for cleaning out the grooves 2 in the splint-supporting member 1 or removing any match-splints that have become lodged therein when the setting head moves rearwardly, said comb being depressed by means of coiled expansion springs 19 and elevated by means of a cam 20 that actuates a bar 21 provided with arms $21^a$ which engage said comb.

A setting head of the construction above described can be repaired easily because the bar 16 and the member 1 which are most liable to become worn are detachably connected to the head, and another advantage of such a setting head is that there is no possibility of the short match-splints and dust lodging on the head or on the member 1 which forms part of the head during the operation of feeding the match-splints to the head, the member 1 being so designed that spaces are formed between same and the front and rear walls of the feeder 9 when said member is in receiving position.

Having thus described my invention, what I claim as new and desire to secure by Letters Patent is:

1. A setting head for match-making machines provided with match-splint-receiving grooves and a removable device that bites into the rear ends of the match-splints during the operation of inserting them in the carrier which conveys them to the dipping tank.

2. A setting head for match-making machines provided with a removable member having a tooth that bites into the rear ends of the match-splints during the operation of inserting said splints in the splint-carrier.

3. A setting head for match-making machines provided with a movable member arranged in front of same and provided with splint-receiving grooves, and a bar detachably connected to said head and provided with a tooth that bites into the rear ends of the match-splints during the operation of inserting them in the splint-carrier of the machine.

4. A setting head for match-making machines provided with a transversely extending bar having a tooth thereon, said bar being detachably connected to the head, a substantially L-shaped member arranged in front of said head and provided in the top face of its horizontal leg with splint-receiving grooves which extend clear across said top face, guide-rods projecting rearwardly from said member through the head, and coiled expansion springs mounted on said rods between said head and stops on said rods.

5. In a match-making machine, a container for holding a mass of match-splints, a match-splint setting member arranged under said container and having a top face which is of less width than said container so that spaces are formed between said member and the front and rear walls of the splint-container when said member is arranged in receiving position, and means that coöperates with said setting member and forms an abutment for the rear ends of the match-splints during the operation of inserting the splints in the splint-carrier of the machine.

6. In a match-making machine, a container for holding a mass of splints, a splint-carrier, a reciprocating setting head arranged under said container, a member carried by said head and arranged in front of same, the top face of said member being of less width than the length of the splints of said container, means for holding said member in such a position when the setting head is in receiving position that the dust, short match-splints and splinters can pass downwardly in front of and at the rear of said member, said means being so designed that the setting head moves into engagement with said member when the setting head moves toward the splint-carrier, and a shoulder on said setting head that bears against the rear end of the splints.

7. In a match-making machine, a container for holding a mass of match-splints, a match-splint-carrier, a setting head, a movable member carried by said setting head and arranged in front of same, the top face of said member being of less width than the length of the match-splints in said container, parallel grooves in the top face of said member for receiving the match-splints from said container, means on the setting head for preventing the match-splints from tilting relatively to said member during the operation of inserting the splints in the carrier, and means for causing said member and setting head to separate when the setting head moves into receiving position so as to form a space between said parts through which short match-splints and dust can escape.

In testimony whereof I hereunto affix my signature in the presence of two witnesses, this 8th day of September 1910.

BERNARD G. VAUGHAN.

Witnesses:
 L. A. SHERWOOD,
 H. LESER.

Copies of this patent may be obtained for five cents each, by addressing the "Commissioner of Patents, Washington, D. C."